Dec. 28, 1965    C. W. EARP    3,226,718
DUAL SIDEBAND RADIO BEACON
Filed Feb. 12, 1963
FIG. 1.
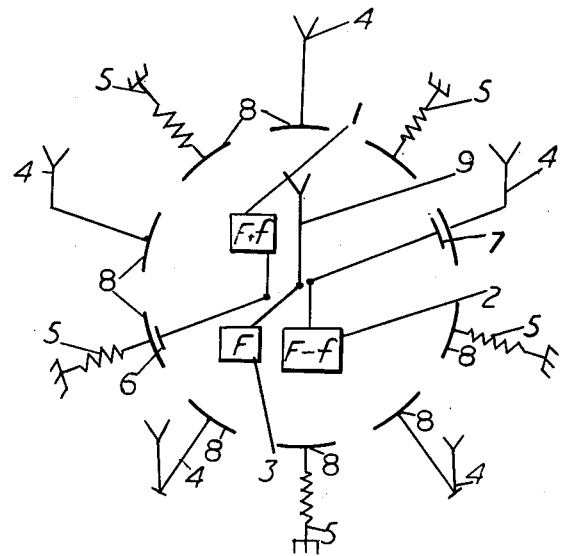
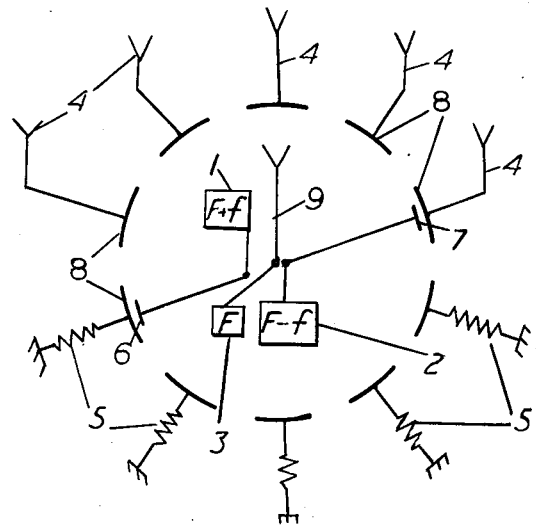
FIG. 2.
Inventor
CHARLES W. EARP
By *Percy P. Lantzy*
Attorney

United States Patent Office 3,226,718
Patented Dec. 28, 1965

3,226,718
DUAL SIDEBAND RADIO BEACON
Charles William Earp, London, England, assignor to International Standard Electric Corporation, New York, N.Y., a corporation of Delaware
Filed Feb. 12, 1963, Ser. No. 257,949
Claims priority, application Great Britain, Feb. 19, 1962, 6,331/62
8 Claims. (Cl. 343—106)

This invention relates to radio beacons in which cyclic movement of an antenna on a circular path is simulated by cyclically commutating radio frequency energy to each one in turn of a number of antennae situated on a circular path.

Beacons of the above type have been used in V.H.F. omni-range (VOR) navigation systems and owing to the larger aperture of the antenna sytem which may be utilized, in comparison with earlier VOR beacons, a reduction in side errors may be obtained.

One disadvantage of beacons of the above type when used on omni-range systems operating in the V.H.F. band or at lower frequencies is the cost of the number of antennae required and another disadvantage is the possibility of undesired interaction between the antennae of the array.

According to the invention there is provided a radio beacon having an odd number of spaced antennae occupying one half of a number of equispaced positions on a circle, no antenna being diametrically opposite another antenna, including means to energize the antennae singly and cyclically from a first source of waves so that the energization cycle travels at a constant speed around the circle, means operative on the energization reaching a position in its cycle unoccupied by an antenna to energize the antenna diametrically opposite that position from a second source of waves, whereby radiation is alternately of waves from the one source and of waves from the other source and whereby the cyclic progression of a pair of diametrically opposite and intermittent sources of radiation is simulated, and means to energize a further antenna at the centre of the circle from a third source of waves, the waves from the first and second sources, having the phases and frequencies of respective equal order amplitude modulation sidebands of the waves from the third source, the beacon being arrayed to transmit a reference signal phase-correlated with the said energization cycle for its indication to a receiver, and the spacing between adjacent positions not exceeding one half of a wavelength at the radiated frequencies.

In one form of V.H.F. omni-range (VOR) beacon, described in co-pending application Serial No. 13,931, filed March 9, 1960, now Patent No. 3,189,159, the gyration of two antennae situated at opposite ends of a diameter of a circle about the centre of the circle is simulated by cyclic commutation of radio frequency energy to diametrically opposite pairs of a number of antennae arranged on the circumference of a circle.

The signals received from such a beacon at a distant receiver will be cyclically modulated in phase at the repetition frequency of the beacon antenna commutation cycle, owing to the cyclical change in path length between the source of radiation and the receiver. By detecting the phase modulation superimposed on the received signal and comparing the phase of the detected signal wave with the phase of a reference wave phase locked to the beacon antenna commutation cycle, the bearing of the beacon from the receiver may be determined.

By adjustment of the parameters, the beacon described in the above-mentioned specification can be made compatible with existing VOR beacon airborne receivers which are in use in large numbers. In order to make the beacon compatible it is necessary to make the diameter of the circle of antenna equal to about 5 wavelengths at the operating frequency. Furthermore in order to limit the phase step which occurs when commutating the radio frequency energy from one antenna to another it is necessary to provide about 50 antennae equally spaced at about ⅔ wavelength on the circumference of the circle. The large number of antennae required account for a considerable part of the cost of a VOR beacon employing a commutated antenna system.

The invention will be further described with reference to a number of embodiments shown in the accompanying drawings in which:

FIG. 1 shows a schematic diagram of a method of feeding an antenna array in a compatible VOR beacon, FIG. 2 shows a schematic diagram of a second embodiment of the invention in a compatible VOR beacon.

Referring to FIG. 1 there are shown V.H.F. transmitters 1 and 2 having frequencies $F+f$ and $F-f$ respectively, where $f$ is 9960 c./s. A further transmitter 3 has a frequency F between 112 mc./s. and 118 mc./s. Both transmitters 1 and 2 are arranged to be coupled in cyclic succession to a circular ring of ten equispaced circuit elements 4 and 5. These circuit elements consist of five omni-directional antennae 4 and five matched loads 5, the other ends of the latter being earthed. It is to be noted that for the sake of simplicity of explanation of the principles involved, only five omni-directional antenna 4 and five matched loads 5 are shown in FIG. 1. In a practical embodiment 25 antennae and 25 matched loads spaced alternately at equal intervals on the circular ring are used.

The coupling arrangement is such that at any instant the transmitters 1 and 2 are coupled to diametrically opposite circuit elements, one of these being an antenna 4 and the other being a matched load 5. The actual coupling is effected by means of capacitive rotary switch elements 6 and 7, these being rotated close to equispaced fixed capacitive elements 8 connected to the circuit elements 4 and 5, the speed of rotation bing 30 c./s.

The transmitter 3 is coupled continuously to a further omni-directional antenna 9 which radiates a wave at frequency F and is located at the centre of the ring of circuit elements 4 and 5. The frequencies $F+9960$ c./s. and $F-9960$ c./s. effectively constitute upper and lower sidebands of the carrier frequency F, since about 90% of the total radiated power is radiated at frequency F. The radiated wave of frequency F is amplitude modulated by a 30 c./s. reference wave which is synchronized with the commutation cycle of switch element 6. In order to make the beacon compatible with existing VOR beacon receivers, when there are 25 antennae and 25 matched loads, the diameter of the circle of antennae is made approximately 5 wavelengths of the operating frequency, and each antenna is spaced from its neighboring matched loads by one third of the operating V.H.F. wavelength.

The transmitter 1 is coupled in turn to each of the segments 8 around the ring. There is thus simulated a radiating source of frequency $F+9960$ c./s. moving at constant speed around the ring by virtue of the successive energization of the antennae 4. Also the transmitter 2 is similarly coupled to the segments 8 so that there is also simulated a radiating source of waves of frequency $F-9960$ c./s. moving around the ring spaced always by half the circumference from the first simulated moving source. Since there is always a matched load 5 diametrically opposite an antenna 4, at any instant there is only one transmitter, either 1 or 2, energizing an antenna 4. The matched loads 5 prevent unwanted reflections of the transmitter energy in this embodiment, but their inclusion is not a necessary feature of the invention, as will be explained later.

At a distant point, there will be received alternately a wave of frequency $F+9960$ c./s. $+q$ and a wave of frequency $F-9960$ c./s. $-q$, where $q$ represents the Doppler shift in frequency due to the relative movement between the radiating sources and the distant points. $q$ will be a maximum (neglecting signs) when the sources are moving directly towards or away from the point, and zero when moving transversely to it, so that $q$ varies sinusoidally with time. The Doppler shifts suffered by the waves from the two sources will always be equal and opposite because of the simulated motions of the sources are always in opposite directions. Apart from a very small overlap to avoid excessive transients on switching only one of the simulated moving sources is actually radiating at any instant.

The distant point will also receive a wave of frequency $F$ from transmitter 3 via the antenna 9. The function of this transmission is to provide a carrier wave to beat with the sidebands $F+9960$ c./s. and $F-9960$ c./s. in a receiver co-operating with the beacon.

Referring now to FIG. 2, there is shown a schematic diagram of a second VOR beacon embodying the invention, all the elements being similar intrinsically and in function to similarly reference-numbered elements in FIG. 1. Again 25 antennae 4 and 25 matched loads 5 are actually used. The essential difference is that the five antennae 4 are arranged in consecutive positions in the ring, and similarly with the matched loads 5. Thus in operation, the transmitters 1 and 2 are coupled in succession to the five antennae 4 and then to the five loads 5. As before, the transmitters are coupled at any instant to diametrically opposed circuit elements 4 or 5, so that at any time only one antenna 4 is energized by either of transmitters 1 and 2.

Thus as before there are simulated a pair of diametrically opposite moving radiating sources on the ring, although each source only radiates while moving around the semicircle containing the antenna 4, being inoperative while moving around the other semicircle. A distant point will receive at any instant a wave from one or other of the simulated moving sources, and the cycle of commutation is repeated at 30 c./s.

The co-operating beacon receiver may be identical to existing airborne VOR beacon receivers large numbers of which are in existence. Such receivers contain an A.M. demodulator stage to detect the 9960 c./s. sub-carrier used to amplitude modulate the signal radiated by the reference antenna of the earlier VOR beacons employing mechanically rotated antennae, an F.M. detector to detect the frequency modulations of deviation$\pm 480$ c./s. super-imposed on the 9960 c./s. sub-carrier, a second A.M. demodulator to detect the 30 c./s. reference signal wave with which the 9960 c.s. signal is amplitude modulated, and a phase comparator to compare the phase of the detected frequency modulation signal wave with the phase of the detected amplitude modulation wave. Also existing VOR beacon receivers must have an R.F. and I.F. band width wide enough to receive the sidebands of the signal radiated from the reference antenna of these earlier small-aperture VOR beacons. The mean value of the spacing of these sidebands from the carrier wave is $\pm 9960$ c./s., so that it follows that the two frequencies of $F+9960$ c./s. and $F-9960$ c./s. radiated from the circular antenna system of the embodiment of the invention will similarly be accepted by the R.F. and I.F. stages of such a receiver.

Each of the two sideband waves at $F+9960$ c./s. and $F-9960$ c./s. will beat with the carrier wave in the amplitude demodulator of the receiver to produce a 9960 c./s. signal whose phase varies cyclically in accordance with the beacon antenna cycle. The cyclic phase modulation of the 9960 c./s. signal is accompanied by a corresponding frequency modulation of deviation $\pm 480$ c./s. in the same way as for a signal received from a "conventional" VOR beacon.

The amplitude modulated carrier signal at frequency $F$ will give rise to the 30 c./s. reference wave at the output of the amplitude demodulator.

The two sideband waves will not be present simultaneously at the first receiver A.M. demodulator, but one of the sidebands will always be present. The phase of the 9960 c./s. beat signal will be the same regardless of which sideband is present. It is important that the carrier wave antenna 3 is located at the centre of the ring of antennae in order that the components at frequency $F+f$ and $F-f$ may each have the correct phase relationship to the carrier at frequency F.

Referring again to the beacon arrangement shown in FIG. 2 since the only signal radiated from the antennae 4 is at a frequency $F+f$ for one half of the commutation cycle and at $F-f$ for the other half of the commutation cycle it follows that the signal radiated from the commutated antenna system will be frequency modulated at the cyclic commutation frequency with a square frequency modulation envelope, the frequency deviation being $\pm 9960$ c./s. The square wave frequency modulation envelope may be obtained by applying the received signal to a frequency discriminator. The detected 30 c./s. square wave could be used as a precise "reference" in place of the 30 c./s. sine wave reference signal with which the carrier wave is modulated. Alternatively the square reference wave having inherent harmonics may be utilized to provide a harmonic reference for improved bearing information accuracy.

Another embodiment of the invention differs from that illustrated in FIG. 1 in that the matched loads 5 are absent, and that the transmitters 1 and 2 are immobilized when not coupled to an antenna 4. Another difference is that switching is electronic instead of capacitative. In this way, there is no waste of transmitter power in matched loads.

In the embodiments described, the antennae are either alternated with matched loads as in FIG. 1, or they are all consecutive on the circle as in FIG. 2. It is possible, however, for the antennae to be distributed in other ways, so long as there is none diametrically opposite another antenna. Whatever arrangement is used each antenna is energized alternately by the two sidebands at equal intervals, and the progression around the circle of a pair of diametrically opposite radiating sources having the two sideband frequencies is simulated. For example, in a beacon having 25 antennae 4 and 25 matched loads 5, distributed as five groups of five consecutive antennae, each group being spaced, by five matched loads, a square reference wave at the fifth harmonic of the energization cycle repetition frequency is obtained, since one energization cycle will contain five cycles of switching from radiation of one sideband to radiating the other. The necessity of having to superimpose a harmonic reference wave on the normal 30 c./s. reference radiated by the carrier wave antenna to give improved instrumental accuracy is thus avoided.

In all of the above described systems, it has been tacitly assured for simplicity of explanation that the antennae 4 radiate square pulses of energy, i.e. the commutative or electronic switching is such that there is no overlapping when two antennae are radiating at once. It is advantageous, however, for there to be a small amount of overlapping, and for an antenna to be gradually instead of abruptly energized and de-energized, in order to lessen the transients transmitted on switching, which may prejudice the evaluation at the receiver. Unfortunately, simultaneous transmission of the same wave from two antennae is also objectionable due to the consequent directional effect.

Embodiments of the type shown in FIG. 1, where no two antennae occupy consecutive positions on the circle avoid these difficulties because at each switching step the sideband radiated is alternated. Thus a slight overlap to reduce transients will not result in two antennae radiating the same wave at one instant.

Another advantage of the embodiment of FIG. 1 is that no two antennae need be closer together than $2\lambda/3$. It is considered that in Doppler VOR systems using only one sideband coupled to the commutated antennae, these cannot be spaced by more than $\lambda/2$, and preferably not more than $\lambda/3$. Embodiments of the type shown in FIG. 1 enable the antenna spacing to exceed $\lambda/2$.

It is to be understood that the foregoing description of specific examples of this invention is not to be considered as a limitation on its scope.

What I claim is:

1. Radio beacon having an odd number of spaced antennae occupying one half of a number of equispaced positions on a circle, no antenna being diametrically opposite another antenna, including means to energize the antennae singly and cyclically from a first source of waves so that the energization cycle travels at a constant speed around the circle, means operative on the energization reaching a position in its cycle unoccupied by an antenna to energize the antenna diametrically opposite that position from a second source of waves, whereby radiation is alternately of waves from the one source and of waves from the other source and whereby the cyclic progression of a pair of diametrically opposite and intermittent sources of radiation is simulated, and means to energize a further antenna at the centre of the circle from a third source of waves, the waves from the first and second sources having the phases and frequencies of respective equal order amplitude modulation sidebands of the waves from the third source, the beacon being arranged to transmit a reference signal phase-correlated with the said energization cycle for its indication to a receiver, and the spacing between adjacent positions not exceeding one half of a wavelength at the radiated frequencies.

2. Radio beacon according to claim 1 wherein the antennae occupy alternate ones of the equispaced positions on the circle, and wherein the reference signal is an amplitude modulation carried by the waves from the third source.

3. Radio beacon according to claim 2 wherein the successive coupling of waves to the antennae is carried out with a sufficient degree of overlap to reduce transient effects, there being no overlap of waves transmitted from the same source.

4. Radio beacon according to claim 1 wherein the antennae occupy consecutive positions on the circle, and wherein the consequent alternation of radiations of waves from the first and second sources automatically provides the arrangement for transmitting the said reference signal.

5. Radio beacon according to claim 1 wherein there are fifty equispaced positions on the circle occupied by five equispaced groups each of five antennae occupying consecutive positions, and wherein a signal provided by the consequent alternation of radiations of the waves from the first and second sources is effectively a fifth harmonic reference signal at five times the frequency of the energization cycle.

6. Radio beacon according to claim 1 wherein the waves have frequencies in the VHF band, and the waves from the first and second sources are separated in frequency from the waves from the third source by plus and minus 9960 c./s. and wherein the energization cycle is repeated at 30 c./s.

7. A radio beacon according to claim 1 including twenty-five antennae on said circle and an equal number of matched loads on said circle each said antenna and each said matched load being alternately spaced on said circle.

8. A radio beacon according to claim 1 including an odd number of antennae on said circle and an equal number of matched loads on said circle said antennae and said matched loads each being arranged in consecutive positions on said circle.

No references cited.

LEWIS H. MYERS, *Primary Examiner.*

CHESTER L. JUSTUS, *Examiner.*